US006999284B2

(12) United States Patent
Tadepalli et al.

(10) Patent No.: US 6,999,284 B2
(45) Date of Patent: Feb. 14, 2006

(54) AERODYNAMIC SLIDERS WITH CURVED SIDE SURFACE

(75) Inventors: Srinivas Tadepalli, Eden Prairie, MN (US); Ram M. Rao, Shorewood, MN (US)

(73) Assignee: Seagate Technology LLC, Scotts Valley, CA (US)

(*) Notice: Subject to any disclaimer, the term of this patent is extended or adjusted under 35 U.S.C. 154(b) by 227 days.

(21) Appl. No.: 10/314,923

(22) Filed: Dec. 9, 2002

(65) Prior Publication Data

US 2003/0213118 A1 Nov. 20, 2003

Related U.S. Application Data

(60) Provisional application No. 60/380,809, filed on May 14, 2002.

(51) Int. Cl.
*G11B 5/60* (2006.01)
*G11B 15/64* (2006.01)
*G11B 17/32* (2006.01)
*G11B 21/20* (2006.01)

(52) U.S. Cl. .................................................. 360/236.7

(58) Field of Classification Search ............ 360/236.7, 360/236.4, 236.5, 235.9, 235.4, 234.3, 234, 360/230

See application file for complete search history.

(56) References Cited

U.S. PATENT DOCUMENTS

| | | | | |
|---|---|---|---|---|
| 4,853,810 A | | 8/1989 | Pohl et al. | 360/234.7 |
| 5,067,037 A | | 11/1991 | Ananth et al. | 360/234.3 |
| 5,508,861 A | | 4/1996 | Ananth et al. | 360/235.4 |
| 5,541,791 A | | 7/1996 | Yamasaki et al. | 360/256.1 |
| 5,572,386 A | | 11/1996 | Ananth et al. | 360/235.7 |
| 5,625,512 A | | 4/1997 | Smith | 360/236.6 |
| 5,635,082 A | * | 6/1997 | Yamamoto et al. | 216/22 |
| 5,739,981 A | | 4/1998 | Cha et al. | 360/236.3 |
| 5,854,725 A | | 12/1998 | Lee | 360/266 |
| 6,069,769 A | * | 5/2000 | Dorius et al. | 360/235.3 |
| 6,563,785 B1 | * | 5/2003 | Schaenzer et al. | 369/300 |
| 6,804,086 B1 | * | 10/2004 | Jones | 360/236.7 |
| 2004/0066580 A1 | * | 4/2004 | Sharma et al. | 360/234.3 |

OTHER PUBLICATIONS

Tani et al., "Reliability Test of High Flying Height Slider Bearings, 2nd Report: Reduction of Dust Adhesion to Sliders," 1992, Proc. Intl' Sessions JSME Spring Annual Meeting, Vo. 69, No. PT. C., pp. 621-623.

* cited by examiner

*Primary Examiner*—Julie Anne Watko
(74) *Attorney, Agent, or Firm*—Westman, Champlin & Kelly

(57) ABSTRACT

An aerodynamic slider has at least one side surface that is continuously curved between the leading and trailing surfaces to substantially eliminate off-track forces on the side surface due to changing skew orientations. A slider profile is modeled, and a numerical simulation of airflow on the modeled profile is generated for each of a plurality of skew orientations within a range of skew orientations at which the slider will fly. The modeled slider profile is repeatedly adjusted based on the numerical simulations until a vibration analysis on the modeled profile indicates vibration does not exceed a predetermined minimum.

13 Claims, 8 Drawing Sheets

AERODYNAMIC SLIDERS WITH CURVED SIDE SURFACE

CROSS-REFERENCE TO RELATED APPLICATION

This application claims priority of U.S. Provisional Application No. 60/380,809 filed May 14, 2002 for "Aerodynamic Slider Profiling for Disc Drives".

FIELD OF THE INVENTION

This invention concerns aerodynamic sliders that are supported by airflow to fly small distances adjacent a moving surface, and particularly to profiled sliders that minimize effects of off-track force on the slider.

BACKGROUND OF THE INVENTION

Magnetic disc drive storage devices store digital data on rotatable magnetizable disc surfaces. Data are written to and read from concentric tracks on the disc surface by read and write transducers, usually called "heads", that are carried on the slider. Each slider is mounted to a flexible suspension that is supported by an actuator arm of an actuator member, such as an E-block. The actuator member is rotated by a voice coil actuator motor to move the slider and head along an arcuate path that is oriented generally radially across the disc. The head is positioned relative to a selected track on the confronting disc by moving the slider along its arcuate path defined by the rotating actuator member.

The disc drags air along its surface in a generally circular pattern around its axis as it rotates. The slider body includes an air bearing surface (ABS) that reacts against the air dragged beneath the ABS by the disc. The airflow develops a lifting force to lift the slider and "fly" it and the head above the disc surface. The flexible suspension supports the slider to the actuator arm and biases the slider against the lifting force of the airflow to maintain a predetermined fly height of the slider adjacent the disc surface.

As the slider moves along its arcuate path generally radially across the disc, its skew changes relative to the circular tracks on the disc between a positive orientation at outer radial tracks and a negative orientation at inner radial tracks. The circular airflow confronts the slider approximately tangentially to the track, so the direction of airflow impinging the slider changes with the skew of the slider. Consequently, the airflow impinging the slider is from a different direction for different skew orientations of the slider. More particularly, the airflow impinges the leading surface (edge) and one or the other side surfaces (edges) of the slider, depending on whether the slider is in a positive or a negative skew orientation.

At a zero skew orientation (where the airflow impinges the leading surface at 90°), any vortices shed from the slider are captured in the wake following the trailing surface. The pattern of vortices is usually symmetrical relative to the slider. However at non-zero skew orientations (either positive or negative skew), the pattern of shed vortices is not symmetrical, leading to asymmetrical off-track forces on the slider that tend to shift the slider radially. If these asymmetrical off-track forces are at the structural mode of the suspension, they may cause non-repeatable runout (NRRO) in the form of radial vibration in the slider and suspension.

As the need increases for disc drives with increased disc data density and performance, a corresponding need arises for increasing track density and media speed. Increasing track density requires reduction of the widths of tracks and spacing between them across the disc radius. Narrower tracks, smaller track spacing and increased media speed all contribute to increasing the need for more precise track following techniques, and particularly to minimizing off-track forces that affect the slider radial position. The present invention provides a solution to this and other problems, and offers other advantages over the prior art.

SUMMARY OF THE INVENTION

In one embodiment, an aerodynamic slider has at least one side surface that is continuously curved between leading and trailing surfaces. The one side surface is curved to substantially eliminate off-track forces on the side surface due at all design skew orientations.

In another embodiment, a slider profile is selected for a slider that flies adjacent a moving medium at differing skew orientations to a direction of air or other fluid flow generated by the medium. A slider profile is modeled, and a numerical simulation of airflow on the modeled profile is generated for each of a plurality of skew orientations within a range of skew orientations at which the slider is intended to fly. The modeled slider profile is adjusted based on the numerical simulations. The slider profile is selected based on a modeled slider profile.

In preferred embodiments, vibration analysis is' performed on the profile model. If the vibration of the modeled profile exceeds a predetermined minimum, the profile is adjusted based on the numerical simulations. The process is iteratively repeated until the vibration analysis indicates the vibration does not exceed the predetermined minimum. Consequently, the NRRO will not exceed pre-selected track mis-registration (TMR) limits.

In some embodiments, the vibration analysis is performed by calculating a radial distance of movement of the modeled slider at a structural mode of the suspension, and the optimal profile is reached when the distance of movement does not exceed the targeted predetermined minimum.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
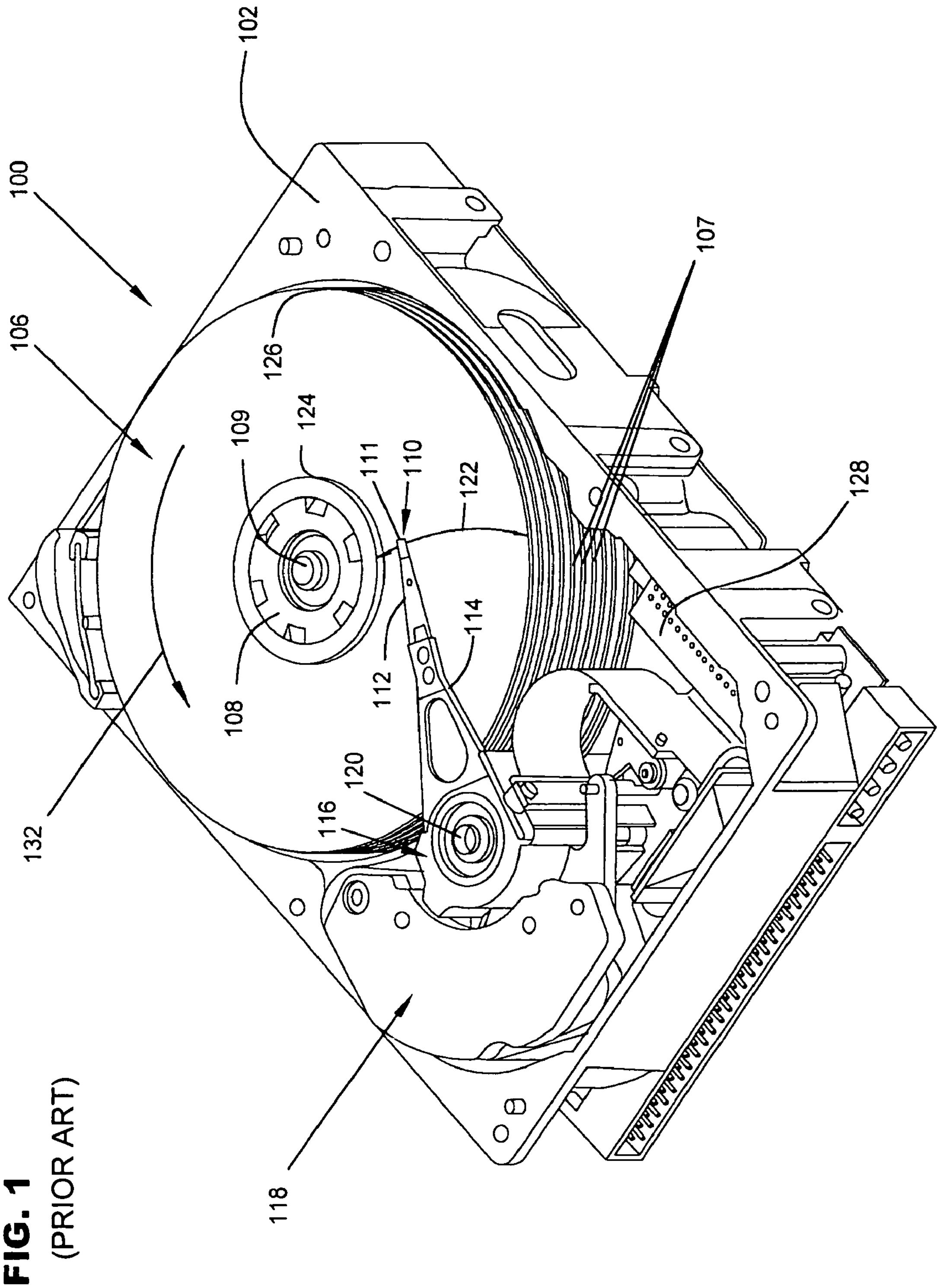
FIG. 1 is a perspective view of a disc drive in which aspects of the present invention may be practiced.

FIG. 1 is a perspective view of a disc drive 100 in which a slider fabricated according to the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an E-block actuator 116. Actuator 116 is driven by a voice coil motor (VCM) 118 to rotate the actuator, and its attached sliders 110, about a pivot shaft 120. Rotation of actuator 116 moves the heads along an arcuate path 122 to position the heads over a desired data track between a disc inner diameter 124 and a disc outer diameter 126.

Voice coil motor 118 is operated by position signals from servo electronics included on circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs.

Figure 2:
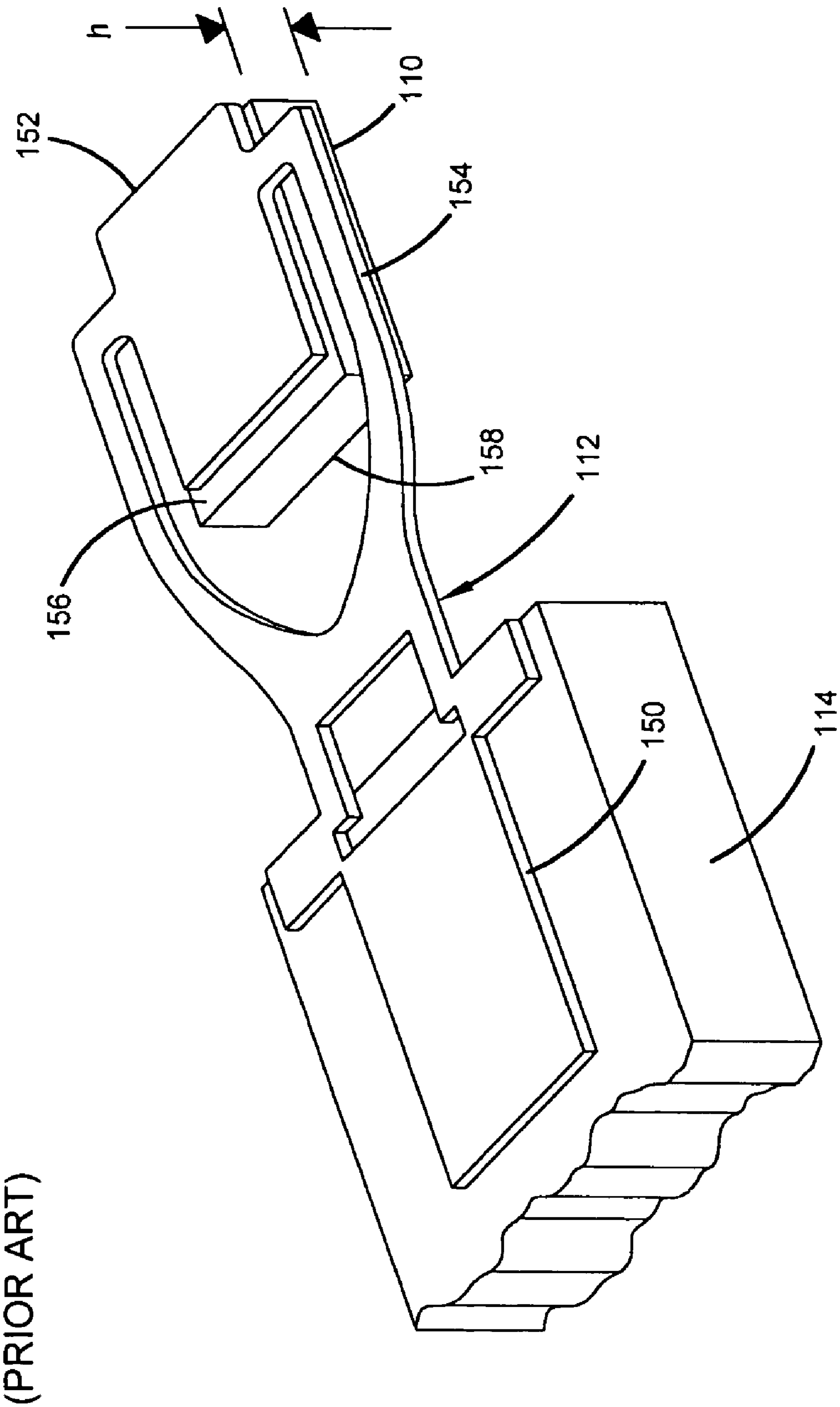
FIG. 2 is a perspective view illustrating a slider supported by a suspension for the disc drive shown in FIG. 1.

FIG. 2 is a simplified diagram of a slider 110 supported by a suspension to an actuator arm. Suspension 112 may be a gimbal spring having a body 150 mounted to actuator arm 114. Slider 110 is fastened to spring portion 152 which in turn is coupled to body 150 by leaf spring portions 154. Slider 110 has a height, or thickness, h, between its opposite surfaces 156 and 158. Surface 158 is arranged by arm 114 and suspension 112 to confront the surface of a disc 107 (FIG. 1), and includes rails and other features (not shown) to provide the flying characteristics of the slider. Air reacting against the air bearing surfaces on the rails and other features generates a lifting force against surface 158 to lift the slider. Suspension 112 provides a design force to counter the lifting force so that the slider "flies" a design distance (height) from the disc.

Figure 3:
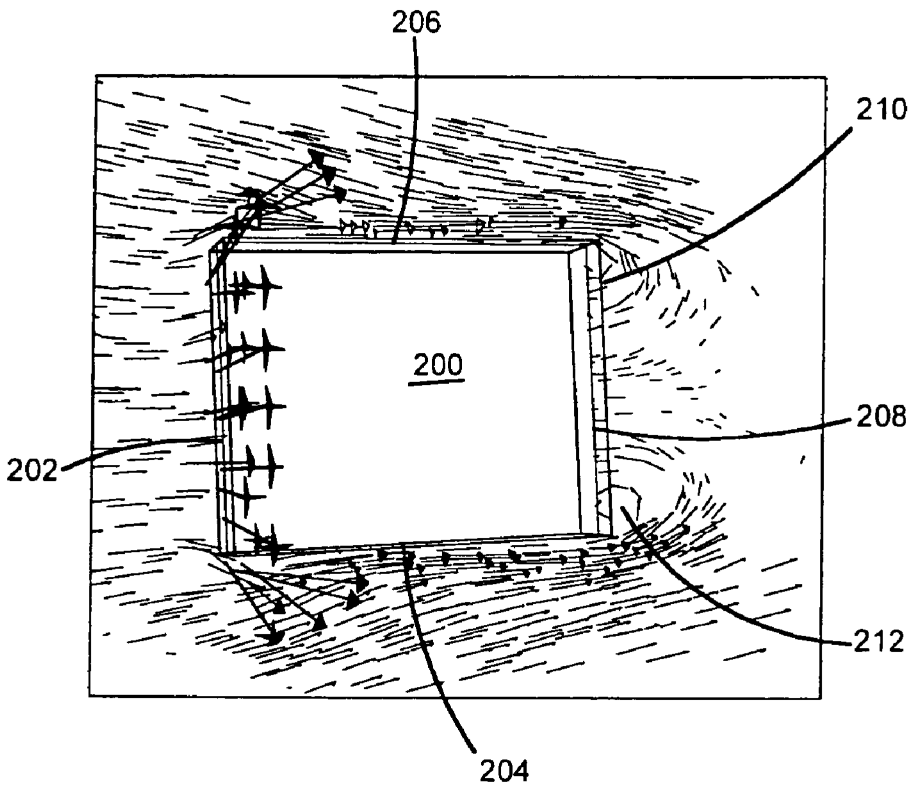
FIGS. 3 and 4 illustrate airflow patterns past a slider at zero and non-zero skew orientations.

FIG. 3 is a diagram modeling velocity vectors confronting an air bearing slider 200 at a zero skew orientation. The bottom surface (not shown) of the slider has rails and other features (not shown) to provide the flying characteristics of the slider. Airflow confronting leading edge surface 202 of slider 200 is displaced over and under the slider. Airflow under the slider supports the slider to "fly" a design height above the disc surface. Displaced air is also concentrated to flow along side surfaces 204 and 206 toward trailing edge surface 208 of the slider. The airflow along the sides 204 and 206 form vortices 210 and 212 that shed from trailing edge surface 208. Since, in FIG. 3, slider 200 is oriented at a zero skew, vortices 210 and 212 are relatively equal and symmetric, and no significant off-track force is imposed on the slider.

Figure 4:
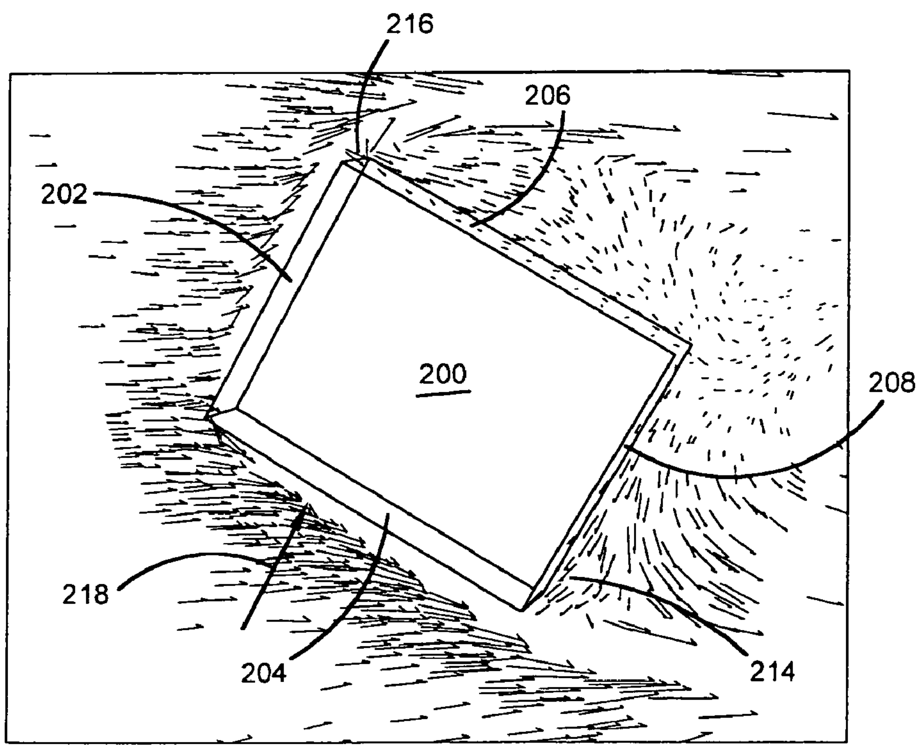

In FIG. 4, slider 200 is oriented at a non-zero skew such that airflow confronts leading edge surface 202 and side surface 204 so that airflow is concentrated along the leading edge from side 204 toward side 206, and along side 204 from leading edge 202 toward trailing edge 208. A vortex 214 sheds from trailing edge 208 adjacent side 204, and a smaller vortex 216 sheds from side 206 adjacent leading edge 202. These asymmetrical vortices shed to generate an off-track force 218, that displaces the slider radially with respect to the track being followed.

The off-track force 218 has a frequency, $f_F$, approximately equal to the shedding frequency, $f_S$, of the vortices, which in turn is based on the slider height and mean velocity of the air impinging the slider. More particularly, the shedding frequency can be calculated as $$f_S = S \cdot U/h,$$

where S is the Strouhal number, U is the mean velocity of the airflow and h is the height or thickness of the slider. If the frequency of the off-track force 218 (and hence the shedding frequency), $f_S$, is approximately the same as the structural mode of the suspension, a resonance will be generated in the suspension at the same frequency, $f_R = f_S$, causing the slider to vibrate radially in a non-repeatable manner. Because this vibration, representing non-repeatable runout (NRRO), is outside the servo bandwidth, it cannot be compensated by the track-following servo mechanism. The present invention is directed at minimizing this vibration.

Figure 5:
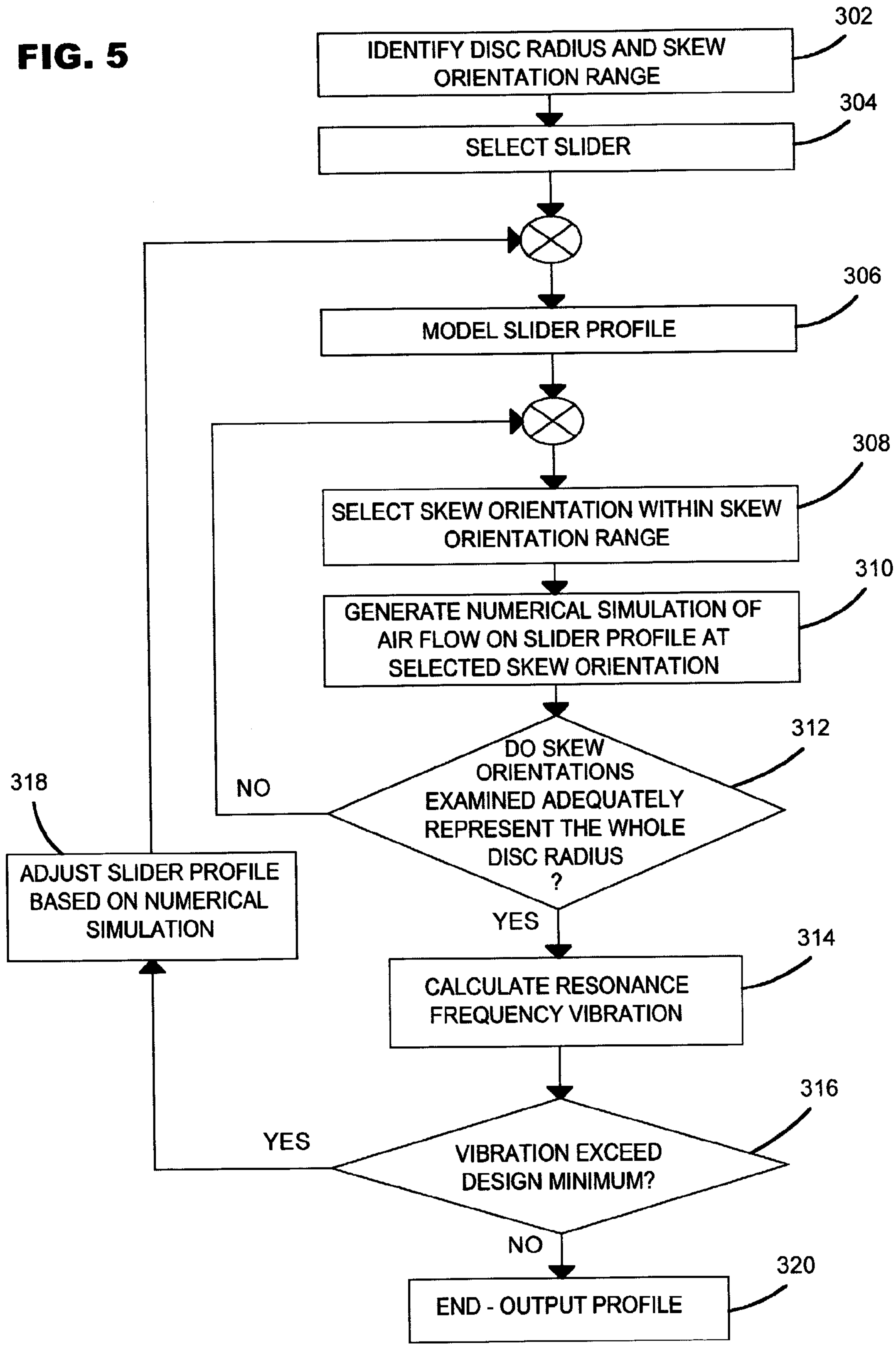
FIG. 5 is a flow diagram of a process for optimizing a slider profile according to a first embodiment of the present invention.

It will be appreciated by those skilled in the art the flow models illustrated in FIGS. 3 and 4 provide numerical simulations of the airflow on the slider. These numerical simulations can be used to generate a profile that will minimize vortex shedding. FIG. 5 is a flow chart of the process of creating a slider profile that generates minimal vortex shedding.

Referring to FIG. 1, the skew orientation of the slider varies from a positive to a negative skew as the slider is moved between the outer and inner radial tracks of the disc. Consequently, the magnitude of the off-track PMS load will change as the slider is moved from the outer to inner tracks. The extent of the skew is dependent upon the geometry of the disc drive, and particularly the radius of the disc and the orientation of the slider on the actuator arm and suspension. Hence, for a given disc drive, the degree of positive and negative skew orientation can be ascertained and the effect of airflow can be modeled for various positions of the slider across the radius of the disc tracks. Based on the numerical simulations for various modeled positions of the slider across the radius of the disc, the shape of the slider can be profiled for minimal turbulence of the slider. More particularly, the profile of the side edge surfaces, leading and trailing edge surfaces and even the top surface of the slider can be shaped so that vortex shedding at the structural modes of the suspension is minimized.

FIG. 5 is a flow diagram of a process of optimizing the slider profile. At step 302 the range of skew orientation between the maximum positive and maximum negative skew is identified from the radii of the inner and outer tracks. A slider is selected at step 304 and a computer model of its profile is generated at step 306. At step 308, a skew orientation is selected within the skew orientation range, and a numerical simulation of airflow on the modeled slider profile is generated at step 310. One convenient technique for generating the numerical simulation is by simulating the airflow on the modeled slider profile using software to generate numerical simulations in the form of numerical lists that represent simulated airflow vectors on the modeled profile. FIGS. 3 and 4 are examples of displays resulting from numerical simulations generated using Fluent 6.0 software.

At step 312, a determination is made as to whether the skew orientations that have been examined adequately represent the skew range between the outer and inner track radii of the disc. More particularly, the effects of airflow on the slider profile are different for each skew orientation between the outer and inner tracks. Consequently, the process requires performing numerical simulations of airflow on the modeled slider profile at plural skew orientations representing the range of track radii. In some cases, the process may be performed with as few as two skew orientations, namely at maximum positive skew and maximum negative skew of the slider (at the outermost and innermost tracks). However, it is more preferred that at least three skew orientations be employed at initial iterations of the process, one each at the maximum positive and negative skews and one at zero skew. Of course more than three skew orientations may be employed in any given case.

If, at step 312, less than the selected number of skew orientations have been examined, the process loops back to step 308 where a new skew orientation is selected and a new numerical simulation is generated as herein described.

If, at step 312, the selected skew orientations have been examined, the process continues to step 314. At step 314, the numerical simulations generated at step 310 are analyzed to calculate probable resonance frequency vibration generated by the off-track forces due to the simulated airflow vectors on the modeled slider profile. More particularly, the numerical simulations of the airflow on the slider profile are examined to identify whether asymmetrical shedding vortices are present that would generate an off-track force on the slider at or near the structural modes of suspension 112 (FIG. 2). If such asymmetrical shedding vortices are present, the airflow vectors are examined to identify the strength, position and direction of the off-track forces, and the expected distance of radial movement of the slider due to the off-track forces. Movement of the slider due to off-track force at the structural modes of suspension 112 contributes to NRRO vibration of the slider.

At step 316, if the vibration movement exceeds a target, or predetermined minimum, (in terms of radial distance of movement of the slider), the process continues to step 318 where the modeled slider profile is adjusted, based on the vibration identified in step 314 and the numerical simulation generated in step 310. The targeted predetermined minimum may be selected on any design criterion, such as meeting track mis-registration (TMR) requirements specified for the disc drive to meet areal and track density specifications. If the vibration analysis on the numerical simulations performed at step 314 indicates that asymmetrical shedding vortices found at step 310 would generate excessive off-track forces on the slider at or near the structural modes of suspension 112 (FIG. 2), the model of the slider profile is altered at step 318, based on the numerical simulations of the airflow vectors to thereby reduce and/or balance the shedding vortices. More particularly, the numerical listings generated at step 310 that simulate airflow vectors provide information on the strength, location and movement of the airflow, and hence of the forces on the slider due to airflow. At step 314, the frequencies, strength and location of the forces were calculated from this information. At step 318 the information concerning the forces is employed to adjust the slider profile model, and the process returns to step 306 where the new (second) profile is modeled. The process repeats through a predetermined number of skew orientations for the second profile.

The process of FIG. 5 continues to iterate through plural profile models until, at step 316, the vibration analysis performed at step 314 on the slider profile model generated at step 306 indicates that the vibration movement meets a target of a predetermined minimal distance. The process then continues to step 320 to output the model created at step 306.

The targeted predetermined minimum distance for the vibration test of step 316 may be any design limit selected by the designer. We have found a convenient vibration threshold is 1% of the track width. That is, the vibration will not move the slider, when supported by suspension 112, by more than 1% of the track width. Hence, vortex shedding is minimized so that vibration due to shedding will not radially vibrate the slider more than 1% of the track width. For disc drives having track widths of 15 microinches (5.8 microns), vibration due to vortex shedding is less than about 0.15 microinches (0.06 microns). Of course, other threshold levels may be selected, based on the particular design for the disc drive.

Actual profiling of the slider is achieved using the output slider profile model. The profile may be created by machining the slider body to the desired shape, or by deposition of material onto the slider body to form the desired shape, or by selectively etching the slider body to achieve the desired shape. Most preferably, however, the desired profile is achieved by applying an adhesive to the slider body to achieve the necessary shape. The adhesive may be the same material used to attach the slider to suspension 112. Conveniently, the adhesive can be applied to shape the slider to the correct profile at the same time as assembly of the slider to the suspension, thereby minimizing fabrication steps. In many cases, the profile model generated at step 306 will itself be asymmetric due to differences in flow loading at different skew orientations of the slider. In such cases, the resulting profile of the slider body may be asymmetric.

After completion of the process illustrated in FIG. 5, it might be desirable to perform shock tests on the suspension to ascertain that the suspension with the profiled slider is able to withstand the design levels of mechanical shock required of the completed disc drive assembly and to assure that adhesive applied to the slider (both for profiling and assembly) is not dislodged.

Figure 6:
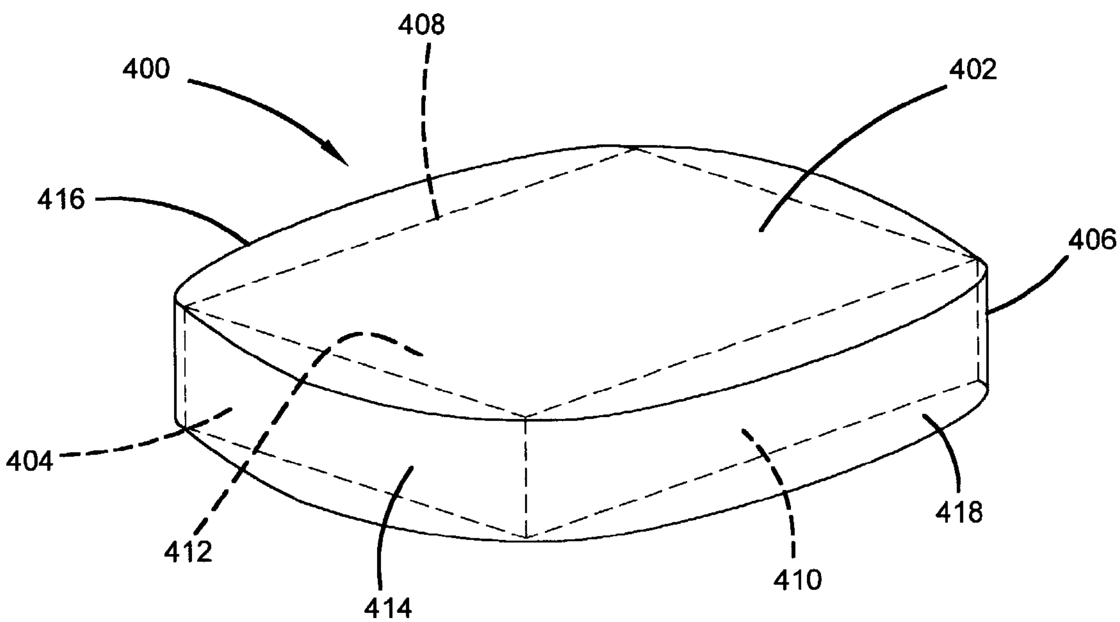
FIG. 6 illustrates a slider according to a second embodiment of the present invention, the slider having a profile generated by the process of FIG. 5.

FIG. 6 illustrates a slider 400 having a substantially rectilinear body 402 whose profile is optimized by the process of FIG. 5 and fabricated in accordance with the present invention. The original rectilinear shape of slider body 402 (namely, which was selected at step 304 in the process of FIG. 5) has rails with air bearing surfaces (not shown), a trailing edge surface 404, leading edge surface 406, side edge surfaces 408 and 410 and top surface 412 (opposite the air bearing surfaces). Aerodynamic surfaces 414, 416, 418 and 420 resulting from the profiling performed by FIG. 5 are shown superimposed on surfaces 404, 408, 410 and 406, respectively.

Trailing aerodynamic surface 414 is useful in environments where the maximum change in skew angle is large, and serves to dispel trailing vortices shed from the slider. Leading aerodynamic surface 420 is useful to streamline air flow past the slider to minimize vortices. In many embodiments, trailing aerodynamic surface 414 and/or leading aerodynamic surface 420 may be omitted. In other embodiments, the aerodynamic surface might be omitted from one of side surfaces 408 and 410, particularly in environments where the skew angle varies between about zero and some positive or negative skew. In yet other embodiments, an aerodynamic surface might be formed on the top surface 412, particularly in environments where windage is high due to high disc rotational velocities. Surfaces 414, 416 and 418 may be formed of adhesive or other material, as previously described. Each surface is patterned from the profile model output at step 320 in FIG. 5. Alternatively, the slider profile may be accomplished by etching or machining the slider, although this technique may require modification of the air bearing surface, should that surface be affected by the removal of slider body material.

As shown in FIG. 6, the aerodynamic surfaces are continuously curved surfaces. Thus, aerodynamic surfaces 416 and 418 extend from the leading edge surface 406 or 420 to the trailing edge surface 404 or 414, aerodynamic surfaces 418 and 420 extend between side surfaces 416 and 418. The shape of the curve may be circular, elliptic, parabolic, or any other continuously curved shape selected by the profiling process. While the curved shape is described as continuous over the entire surface, the rate of curvature may change along the surface between the leading and trailing edge surfaces. Further, the curved shape of side surface 416 may be different from the curved shape of side surface 418, such as where the slider is used in environments wherein the maximum positive and negative skew angles are not the same. In any case, however, at least one side surface of the slider is profiled as described to significantly minimize and substantially eliminate vortex shedding from the slider for all design skew orientations of the slider, thereby substantially eliminating off-track forces on the slider due to wind.

Figure 7:
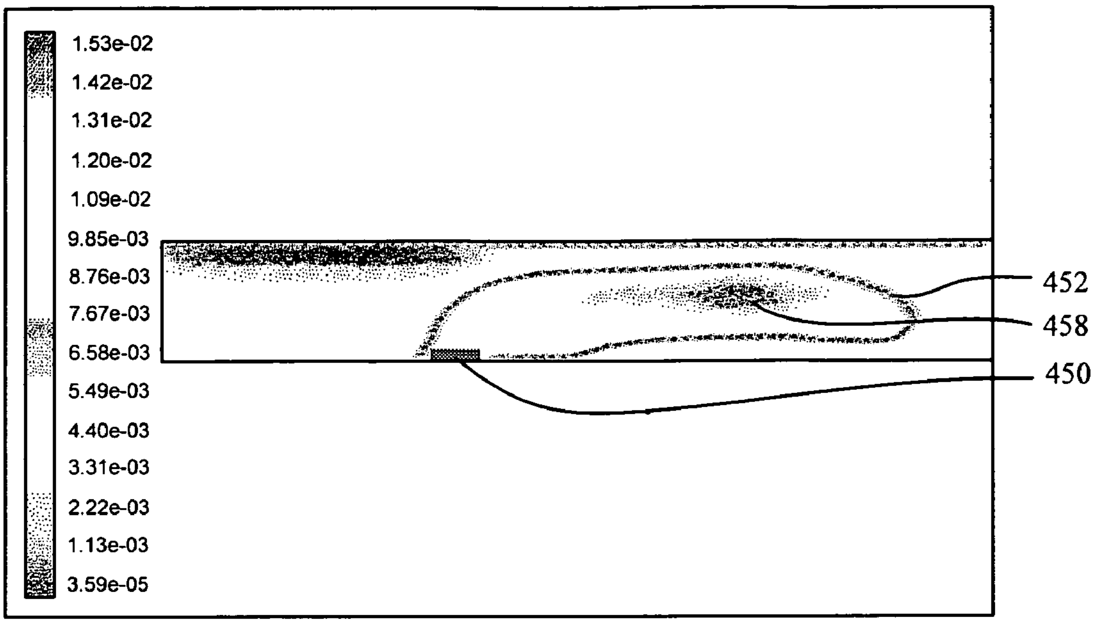
FIGS. 7 and 8 are microphotographs comparing a standard and a slider according to the present invention.
Figure 8:
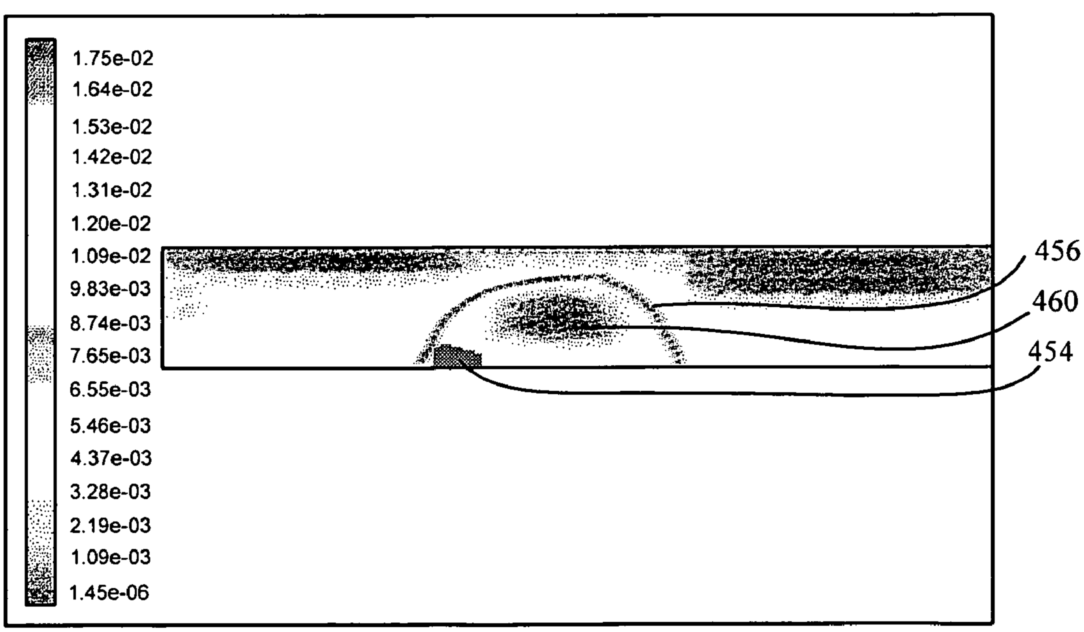
Figure 9:
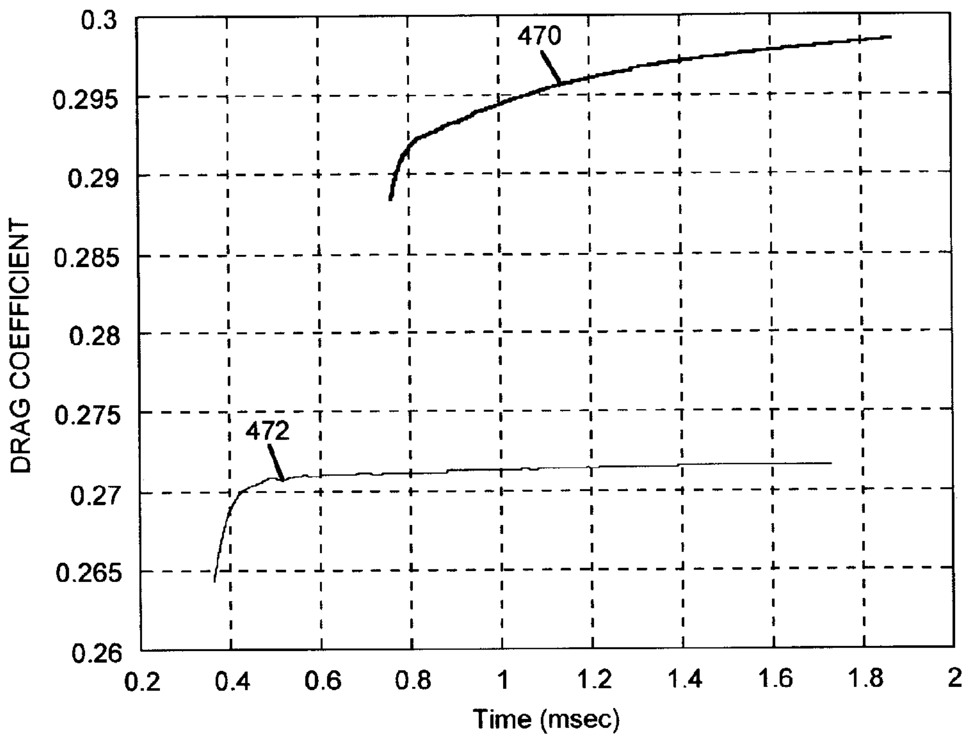
FIGS. 9 and 10 are graphs illustrating the advantages of the slider profiled according to the present invention.
Figure 10:
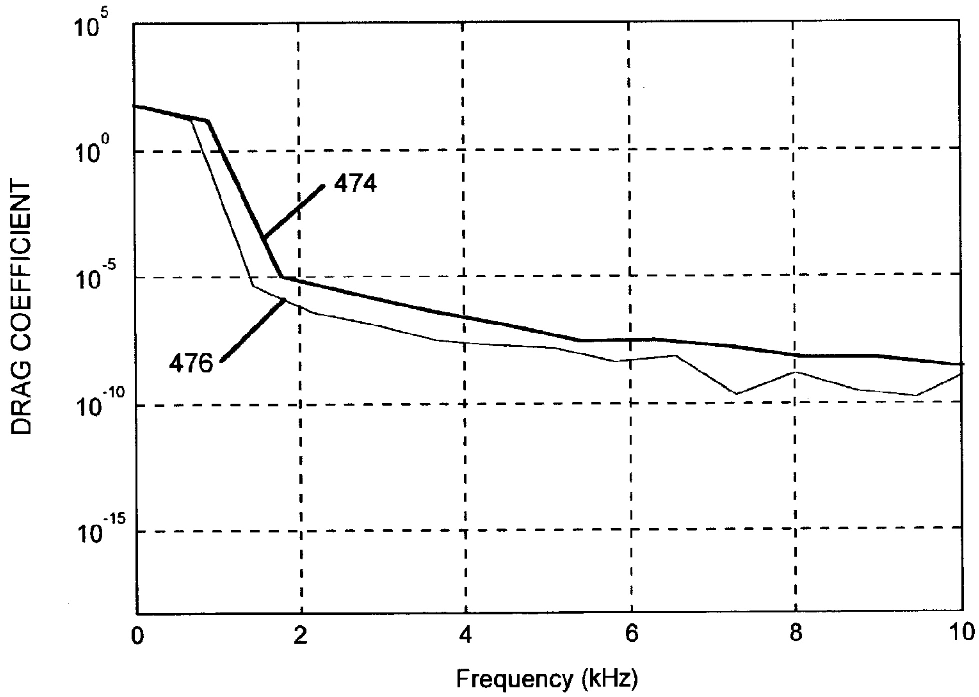

FIGS. 7–10 illustrate advantages of the present invention. FIG. 7 is a microphotograph of a standard slider 450 whose profile has not been optimized by the present invention, showing the pattern of a trailing airflow 452. FIG. 8 is a microphotograph of a slider 454 whose profile has been optimized by the present invention, showing the pattern of a trailing airflow 456. A comparison of the airflow patterns 452 and 456 reveals that the extent of the re-circulation zone 460 from the optimized slider 454 is smaller than the re-circulation zone 458 from the standard slider 450. FIG. 9 illustrates the drag coefficient for both the standard (470) and optimized (472) sliders verses time, and FIG. 10 illustrates the drag coefficient for standard (474) and optimized (476) sliders versus frequency. These graphs demonstrate the improved (lower) drag coefficient of the optimized slider.

In one embodiment, the present invention provides an aerodynamic slider having a substantially rectilinear body (400) defining an air bearing surface arranged to confront a moving medium (107) that generates fluid flow to support the slider to fly adjacent the medium, a top surface (412) opposite the air bearing surface, a leading surface (406) arranged to confront fluid flow, a trailing surface (414) opposite the leading surface, and first and second opposite side surfaces (416 and 418) between the leading, trailing, air bearing and top surfaces. The slider is characterized that at least one of the side surfaces (416 or 418) is continuously curved between leading and trailing surfaces. The slider is arranged to fly adjacent a moving medium at different skew orientations and is further characterized that at least one of the side surfaces (416 or 418) is curved to substantially eliminate off-track forces (218) on that side surface.

In another embodiment, the present invention provides a process of selecting a profile for a slider 110 for flying adjacent a moving medium 107 at differing skew orientations to a direction of airflow generated by the medium. The profile of the slider is modeled (step 306) and a numerical simulation of airflow on the modeled profile is generated (step 310) at each of a plurality of skew orientations (step 312). The skew orientations are within a range of skew orientations at which the slider is intended to fly relative to the airflow (step 302). The slider profile model is adjusted (step 318) based on the numerical simulations (steps 314–316). A slider profile is selected (step 320) based on a modeled slider profile. In preferred embodiments, the process is iteratively repeated to optimize the profile.

Preferably, a vibration analysis is performed (step 314) on the slider model using the numerical simulations. If the vibration at the suspension structural modes exceeds a predetermined minimum at step 316 (such as causing more than about 1% of track width movement of the slider), the slider profile is adjusted at step 318. The process is iteratively repeated until the movement of the slider does not exceed the targeted predetermined minimum, whereupon the slider model is output.

The process of the present invention is not limited by disc drive spindle speed or disc diameter, nor by the number of discs operated by the disc drive. Instead, the invention is applicable to single-disc and multiple-disc disc drives that operate at high spindle rotational speed as well as low spindle rotational speed, as well as to disc drives with large diameter storage discs as well as small diameter discs. Moreover, the invention may be employed to profile sliders and other devices that operate in any fluid medium, including air, helium and other gases, as well as liquids.

Although the present invention has been described with reference to sliders for magnetic disc drives, those skilled in the art will recognize that the present invention may be practiced with other systems employing rotatable storage media, including but not limited to servo track writers, multi-disc writers, track writing testers, head testers, disc surface profilers, optical drives, as well as to systems employing other types of technologies, such linearly moving media found in tape drives and the like.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the process while maintaining substantially the same functionality without departing from the scope and spirit of the present invention. Thus, while the invention is described in connection optimization of slider profiles for use with rotatable media, the process might be applied to other devices designed for relative movement with respect to a surface, regardless of whether the surface is used for data storage. Additionally, while the process is described in connection with specific software programs to perform many of the steps of the process, other techniques and programs might be employed to perform the same function, without departing from the scope and spirit of the invention.

What is claimed is:

1. A slider having a substantially rectilinear body defining an air bearing surface arranged to confront a moving medium that generates fluid flow to support the slider to fly adjacent a surface of the medium, a top surface opposite the air bearing surface, a leading surface arranged to confront fluid flow, a trailing surface opposite the leading surface, and first and second opposite side surfaces extending continuously between the air bearing and top surfaces and the leading and trailing surfaces, characterized in that at least one side surface comprises a profile as viewed from at least one of the top and bottom surfaces, which is continuously curved between the leading and trailing surfaces.

2. The slider of claim 1, wherein the trailing surface is continuously curved between the first and second side surfaces.

3. The slider of claim 1, wherein the leading surface is continuously curved between the first and second side surfaces.

4. A slider having a substantially rectilinear body defining an air bearing surface arranged to confront a moving medium that generates fluid flow to support the slider to fly adjacent a surface of the medium, a top surface opposite the air bearing surface, a leading surface arranged to confront fluid flow, a trailing surface opposite the leading surface, and first and second opposite side surfaces extending continuously between the air bearing and top surfaces and the leading and trailing surfaces, wherein the slider is arranged to fly adjacent the medium at differing skew orientations to a direction of fluid flow, characterized in that at least one side surface is curved from the leading surface to the trailing surface to substantially eliminate off-track forces on the at least one side surface at differing skew orientations.

5. The slider of claim 4, wherein the at least one side surface is continuously curved between the leading and trailing surfaces.

6. The slider of claim 4, wherein the trailing surface is continuously curved between the first and second side surfaces.

7. The slider of claim 4, wherein the leading surface is curved between the first and second side surfaces.

8. The slider of claim 4, wherein the first and second side surfaces are curved to substantially eliminate off-track forces on the first and second side surface due to skew orientations changing between positive and negative.

9. A slider having a body defining a bearing surface, a leading surface arranged to confront fluid flow, a trailing surface opposite the leading surface, and first and second opposite side surfaces extending continuously between the leading and trailing surfaces, wherein at least one of the side surfaces comprises a profile as viewed from at least one of the top and bottom surfaces, which is continuously curved between a first and a second end of the respective surface.

10. The slider of claim 9, wherein the trailing surface is continuously curved between the first and second side surfaces.

11. The slider of claim 9, wherein the leading surface is continuously curved between the first and second side surfaces.

12. The slider of claim 9, wherein the first and second side surfaces are continuously curved between the first and a second ends of the respective surfaces.

13. The slider of claim 9, wherein the first and second side surfaces are continuously curved between the first and a second ends of the respective surfaces to substantially eliminate off-track forces on the first and second side surface due to skew orientations changing between positive and negative.

* * * * *